(12) United States Patent
Veil et al.

(10) Patent No.: US 6,246,318 B1
(45) Date of Patent: Jun. 12, 2001

(54) MODULAR SAFETY SWITCHING

(75) Inventors: Richard Veil, Stuttgart; Winfried Gräf, Esslingen, both of (DE)

(73) Assignee: Pilz GmbH & Co., Ostfildern (DE)

( * ) Notice: Subject to any disclaimer, the term of this patent is extended or adjusted under 35 U.S.C. 154(b) by 0 days.

(21) Appl. No.: 09/367,127
(22) PCT Filed: Feb. 5, 1998
(86) PCT No.: PCT/DE98/00313
§ 371 Date: Aug. 5, 1999
§ 102(e) Date: Aug. 5, 1999
(87) PCT Pub. No.: WO98/38664
PCT Pub. Date: Sep. 3, 1998

(30) Foreign Application Priority Data

Feb. 25, 1997 (DE) .............................................. 197 07 241

(51) Int. Cl.⁷ .................................................. B60Q 11/00
(52) U.S. Cl. .......................... 340/458; 340/567; 340/507; 340/508
(58) Field of Search .............................. 340/458, 825.75, 340/507, 508, 514, 517, 518, 638, 639; 307/113, 132 R; 700/9, 12

(56) References Cited

U.S. PATENT DOCUMENTS

| | | | |
|---|---|---|---|
| 3,582,933 | * 6/1971 | Place | 340/567 |
| 4,414,539 | * 11/1983 | Armer | 340/507 |
| 4,725,820 | * 2/1988 | Kimura | 340/508 |
| 4,762,663 | 8/1988 | Cook et al. | 376/259 |
| 5,402,101 | * 3/1995 | Berger et al. | 340/508 |

FOREIGN PATENT DOCUMENTS

| | | |
|---|---|---|
| 33 04 052 | 2/1983 | (DE) . |
| 35 19 807 | 6/1985 | (DE) . |
| 41 00 699 | 1/1991 | (DE) . |
| 41 35 749 | 10/1991 | (DE) . |
| 44 32 768 | 9/1994 | (DE) . |
| 0 505 774 | 9/1992 | (EP) . |

* cited by examiner

Primary Examiner—Jeffery Hofsass
Assistant Examiner—John Tweel, Jr.
(74) Attorney, Agent, or Firm—Nilles & Nilles SC

(57) ABSTRACT

A modular safety switching device is set up such that various signaling devices in a set of possible connectable signaling devices can be connected. In this case, a typical combination of inputs and outputs that are used is provided for each signaling device. The nature of the connection of the signaling device is unique for each signaling device within the set, by which the safety switching device can identify during startup, on the basis of the electrical connections that are made, which type of signaling device is connected and what function is required for identical signaling devices. The safety switching device automatically changes itself to the required operating mode in accordance with this association.

16 Claims, 6 Drawing Sheets

| | 18 | 19 | 21 | 22 | 23 |
|---|---|---|---|---|---|
| 15 | FIG.7 | FIG.3 or 4 | FIG.9 | FIG.8 | FIG.5 |
| 16 | FIG.3 or 4 | FIG.7 | FIG.9 | FIG.6 | FIG.8 |
| 17 | FIG.2 | FIG.9 | FIG.7 | FIG.6 | FIG.8 or 5 |

FIG. 10

MODULAR SAFETY SWITCHING

BACKGROUND OF THE INVENTION

1. Field of the Invention

As production or manufacturing sequences are becoming automated by using complex machines or robots, the safety requirements are becoming more stringent. Modern conventional machines and robots largely run under fully automatic control, but nevertheless have no intelligence allowing them to identify whether people may be located in dangerous proximity. In order nevertheless to preclude hazards, the systems or system parts are protected by protective fences, covering shrouds and the like. In order to gain access to the appropriate machine parts for servicing and setting up, the protective fences have doors in them, and the covering shrouds can be opened.

The safety provided by the protective fence is, of course, lost as soon as the door is opened, for which reason the state of the doors must be monitored by independent safety switching devices, in order to stop the machine in good time. A similar situation applies to machine shrouds, for example in blow molding devices, injection molding or die casting machines, or machining centers.

The requirements for safety based on state identification differ from one machine type to another and from one system to another, for which reason different signaling devices are used for state monitoring. The simplest signaling device comprises a simple break contact, which is used to monitor servicing panels that need to be opened occasionally. The most complicated signaling device contains two sets of switches, with each set having a break contact and a make contact. Such complicated signaling devices are used where the safety requirements are particularly stringent and if, for example, a switch test also has to be carried out when voltage is returned.

Similar requirements apply to emergency-stop switches, for which there are likewise various safety levels, resulting in correspondingly complicated signaling devices.

2. Description of the Related Art

The actual safety device which is intended to evaluate the operating state of the signaling devices is, fundamentally, largely independent of the type of signaling device. This applies in particular to those functions which relate to and monitor the safety of the safety switching device itself. Nevertheless, in the past, an appropriate safety switching device has been provided for each type of signaling device, and is matched to it. This has resulted in increased storage requirements and repair problems since only the respective safety switching device that is matched to the corresponding type of signaling device can be used.

Another approach that has been taken was to use jumpers in order to match the safety switching device to the respective type of signaling device, although this can lead to errors.

Against this background, the object of the invention is to provide a safety switching device which is suitable for connection of signaling devices from a set of signaling devices, and which requires no additional programming means.

This object is achieved according to the invention by a safety switching device having the features of claims 1, 2 or 3.

The safety switching device according to the invention has a set of inputs and/or outputs, in which case each signaling device in the set of signaling devices which may possibly be connected is assigned one or more inputs and/or outputs. An identification device is used to check whether the inputs and/or outputs associated with the relevant signaling device type, and otherwise no inputs and/or outputs are connected. In this way, the safety switching device identifies the respective type of signaling device, and internally controls its signal processing or relaying.

The identification device can be implemented relatively simply by containing a table which indicates which inputs and/or outputs may permissibly be connected in combination in each case. The identification device checks all the inputs and/or outputs and compares the signals recorded during the test with the table which contains the permissible association. The safety switching device is released only when the check has confirmed that only permissible inputs and/or outputs are connected, and that the inputs and/or outputs which are associated with a signaling device type are absolutely all connected to the signaling device. In this case, it may be necessary to close the make contacts briefly by operating the protective door or the emergency-stop switch.

In the case of simple safety switches for servicing panels that are used occasionally and for Category 1 emergency-stop switches, it is sufficient for the signaling device to be formed by a switch having one break contact. In configurations having a plurality of signaling points, a corresponding number of signaling devices of this type are provided.

For protective door monitoring at a high safety level, including possible cross-connection identification in the connecting cable, the signaling device contains two break contacts, which are either controlled separately from one another by means of a cam, or are positively coupled to one another. Such signaling devices are also used for Category 4 emergency-stop switches.

If a high safety level is desired, signaling devices having a make contact and a break contact are used for protective door monitoring and the two are coupled to one another such as they are interlocked in an opposing manner. The same type of signaling device is also used for a start-up test although, in this case, the protective door must be operated, for example.

Protective devices for injection molding or die casting machines or blow molding machines require signaling devices with a total of three break contacts per channel, in which case one of the break contacts is mechanically coupled to a main shut-off valve, in order to detect its position, while the other two break contacts monitor the protective door.

Finally, signaling devices for protective door safety are known which contain two sets of contacts, in which case one switch is a break contact and the other switch is a make contact. Contacts in each set are positively coupled to one another.

It is self-evident that this identification device is present in each channel in multi-channel safety switching devices, in order that each channel can check the connected signaling devices independently of the other. The two channels expediently compare the result of their checks, and do not release the safety switching device until it has been confirmed that both channels are correctly connected to the same type of signaling device.

In addition, developments of the invention are the subject matter of dependent claims.

BRIEF DESCRIPTION OF THE DRAWINGS

Exemplary embodiments of the subject matter of the invention are illustrated in the drawing, in which:

FIG. 10 shows the association table between the input, output and signaling device type.

DESCRIPTION OF THE PREFERRED EMBODIMENTS

Figure 1:
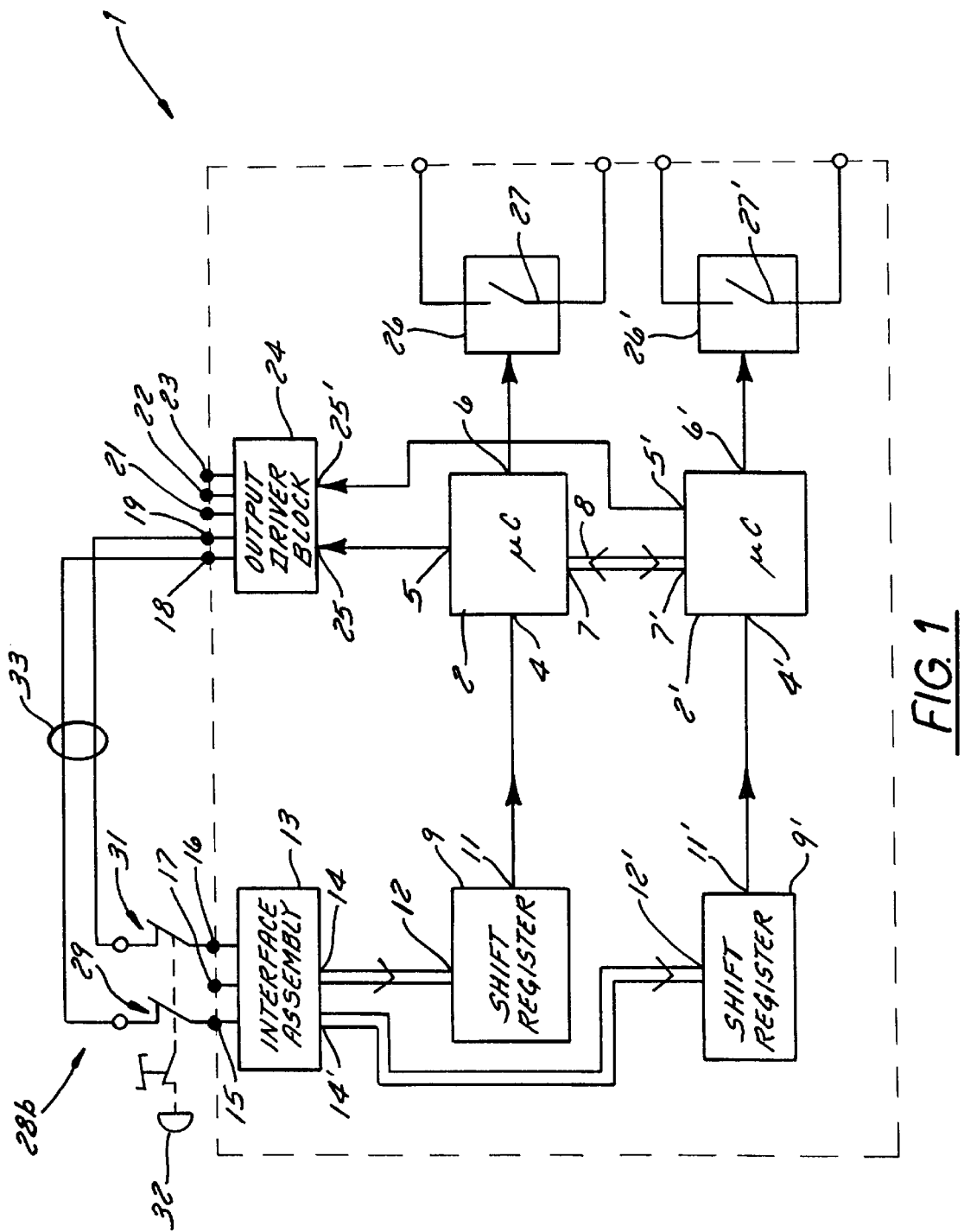
FIG. 1 shows the outline circuit diagram of a two-channel safety switching device which is suitable for identifying the signaling device.

FIG. 1 shows the outline circuit diagram of a two-channel safety switching device 1. The core of the safety switching device 1 is formed by two microcontrollers or microcomputers 2 and 2', which carry out the actual monitoring and evaluation.

The microcomputer 2 has a serial input 4, a parallel output 5, a serial output 6 as well as a combined input/output 7. The microcomputer 2' is constructed in a similar manner, that is to say it has inputs and outputs which correspond to those of the microcomputer 2 and which, in the context of the microcomputer 2', are denoted by the same reference symbols, followed by an apostrophe. The combined inputs/outputs 7 and 7' are connected to one another via a data line 8 and allow the two microcomputers 2 and 2' to correspond with one another and to interchange data.

A shift register 9 is connected by its serial output 11 to the serial input 4, and this shift register 9 also has a parallel input 12.

The microcomputer 2' is connected in a similar manner to a shift register 9', to be precise with its serial output 11' being connected to the serial input 4'. The shift register 9' also has a parallel input 12'.

An interface assembly 13, which contains filters and voltage level converters from 24 V to 5 V, is connected to the parallel inputs 12 and 12' of the two shift registers 9 and 9'. The interface assembly 13 is connected via two parallel outputs 14 and 14 'to the parallel inputs 12 and 12', respectively, of the two shift registers 9, 9' as shown. Furthermore, the interface assembly 13 is provided with a total of three single-pole inputs 15, 16 and 17, which at the same time represent the inputs of the safety switching device 1.

The safety switching device 1 also includes a plurality of signal outputs 18 . . . 23, a total of 5 in the illustrated exemplary embodiment, which are single-channel 24 V outputs of an output driver block 24 whose inputs 25 and 25' are connected to the output 5 and 5', respectively, of the two microcomputers 2 and 2'.

Finally, the safety device 1 also includes two output relays 26 and 26', which are actuated via the serial outputs 6 and 6' respectively. Each of the output relays 26 and 26', respectively, contains a make contact 27 and 27' respectively. These make contacts 27 and 27' are connected toward output terminals of the safety switching device 1, and are connected in the appropriate control circuit or supply circuit of the respective machine being monitored.

In the illustrated exemplary embodiment, the safety switching device 1 is used as an emergency-stop device and is therefore connected to a signaling device 28b which is used as an emergency-stop switch. The signaling device 28b has two break contact switches 29 and 31 which are positively coupled to one another and can be operated manually via an operating knob 32.

From the signaling device 28b, one end of the break contact switch 29 is connected to the input 15, and the other end is connected to the output 18. The other break contact switch 31 is located between the input 16 and the output 19, with the connection for the two outputs 18 and 19 having two poles.

This safety switching device 1 operates as follows:

When the supply voltage returns after an interruption in the voltage supply for the safety switching device 1, the two microcomputers 2 and 2' first of all carry out an identification routine in order to identify the type of signaling device 28. To this end, a dialog between the two microcomputers 2 and 2' is followed first of all by the microcomputer 2 passing an appropriate signal sequence via its output 5 to the output driver 24. This signal sequence results in the output voltage of 24 V being applied for a short time to each of the outputs 18 . . . 23 successively and at times that do not overlap.

The microcomputer 2 first of all causes 24 V to be present at the output 18. This 24 V passes via the connecting line 33 to the closed break contact 29, and from there to the input 15 of the safety switching device 1. In the interface block 13, the incoming voltage of 24 V is reduced to 5 V, and the signal is also filtered. The digital signal obtained in this way passes via the multipole connection between the output 14 and the output 12 into the shift register 9, which has the same number of steps as the number of inputs to the safety switching device 1, that is to say three steps in the present case.

The microcomputer 2 reads the shift register 9 in serial form via a clock line which is not shown in any more detail, and in this way receives the information that 24 V is present at the input 15. The microcomputer 2 uses this to identify the fact that there is an electrical connection between the output 18 and the input 15, and that no other input is connected to the output 18.

Next, the output 18 is disconnected, and 24 V are applied to the output 19 instead of this. As soon as this is done, the computer once again checks the situation at the inputs 15 to 17, in the same way as that already described above. Since the signaling device 28 is connected correctly, the voltage of 24 V at the output 19 leads to an input signal at the input 16 via the closed break contact 31, which the microcomputer determines with the aid of the interface block 13 and of the shift register 9, which is used as a parallel/serial converter.

After this, the output 19 is disconnected, and 24 V is applied to the output 21 instead of this. As soon as this is done, the computer once again checks the situation at the inputs 15 to 17, in the same way as that explained above. Since the signaling device 28b is connected correctly, the voltage of 24 V at the output 21 leads to there being no input signal at one of the inputs 15 to 17. The same results are achieved when the microcomputer 2 then continues by successively connecting 24 V to the outputs 22 and 23.

As a result of the fact that the output 18 is connected to the input 15 and the output 19 is connected to the input 16, the microcomputer 2 in the safety switching device 1 determines that a two-pole emergency-stop button 28b is connected as the signaling device.

The identification routine described above is then next run on the microcomputer 2', and the two microcomputers 2 and 2' then compare their test results. If these test results match one another and comply with a table which will be explained further below and is shown in FIG. 10, the two outputs 18 and 19 which are required for the signaling device 28b are next once again connected to 24 V, and remain at 24 V until the supply voltage for the safety switching device 1 is switched off.

Since the two microcomputers 2 and 2' now know that the emergency-stop button 28b is connected correctly, and also that its two switch contacts 29, 31 are closed, the microcomputers 2 and 2' cause the associated output relays 26 and 26' to switch over. The make contacts 27 and 27' are closed, by which means, for example, the pressing circuit for a press is switched on.

FIGS. 2 to 9 show the set of signaling devices 28 which can be connected to the safety switching device 1. In this case, the ends of the switch contacts are denoted by the reference symbols 15 to 17 and 18 to 23 in FIGS. 2 to 9, in order to symbolize the input and output, respectively, of the safety switching device 1 to which the relevant switch contact must in each case be connected.

Figure 3:
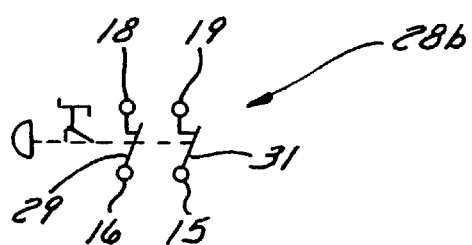

FIG. 3 shows the signaling device 28b, which has been explained in detail in conjunction with FIG. 1. As can be seen, the break contact switch 29 is connected to the output 18 and to the input 16, while the break contact switch 31, as is symbolized by the reference symbols 15 and 19, must be connected to the input 15 and to the output 19.

Figure 2:
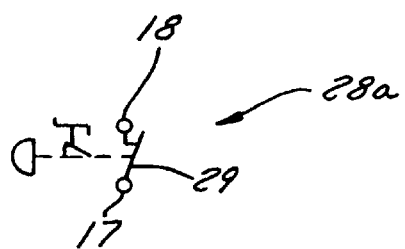
FIGS. 2 to 9 show different versions of signaling devices.

An even simpler signaling device than the signaling device 28b is shown as the signaling device 28a in FIG. 2. This signaling device 28a is a single-channel emergency-stop button, and contains only the break contact switch 29. This is connected to the input 17 and to the output 18.

Figure 4:
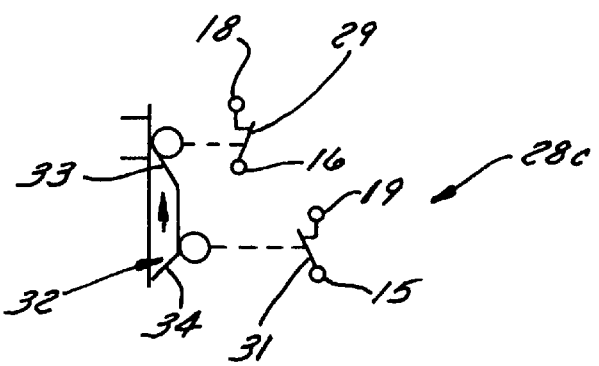

FIG. 4 shows a signaling device 28c for monitoring protective doors, having two switches 29 and 31 which can be operated independently of one another and of which the switch 29 is a break contact switch and the switch 31 a make contact switch, which is likewise closed when the door is closed. These two switches 29 and 31 are operated with the aid of a cam 32, to be precise in such a manner that running onto the cam flank 33 opens the break contact switch 29. A further, falling cam flank 34, on the other hand, opens the make contact switch 31 via a corresponding cam follower.

Although the signaling device 28c has the same type of contacts as the signaling device 28b, it is, however, used for a different purpose. Nonetheless, the safety switching device 1 evaluates the two signaling devices 28b and 28c in the same manner, for which reason the break contact switches 29 and 31 in the signaling device 28c are connected to the safety switching device 1 in the same way as the signaling device 28b.

The signaling device 28c is used for a high safety level and allows cross-connection identification between the wires either in the connecting line to the inputs 15 and 16 or in the connecting line to the outputs 18 and 19. Such safety switches are used in the operating area for protective doors.

Figure 5:
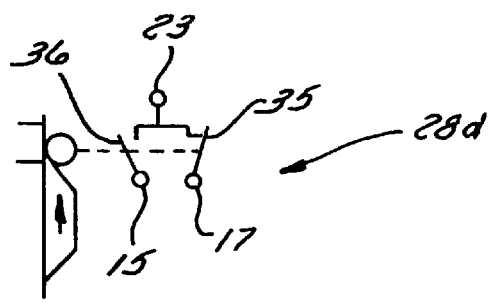

FIG. 5 shows a signaling device 28d, likewise for protective door monitoring, having a positively opening break contact switch 35 and a make contact switch 36, which are mechanically coupled to one another so that they can be operated only jointly. This type of signaling device makes it possible to distinguish between an open protective door and faulty wiring.

The common connection of the break contact switch 35 and of the make contact switch 36 is for this reason connected to the output 23, while the make contact switch 36 is connected to the input 15, and the break contact switch 35 is connected to the input 17.

Figure 6:
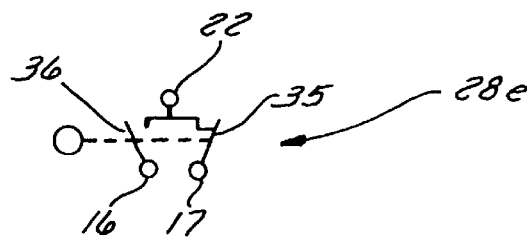

FIG. 6 shows a signaling device 28e which acts in a similar manner to the signaling device 28d but is intended to ensure that a start-up test is carried out. In consequence, the safety switching device 1 is intended to behave differently, in the sense that the output relays 27 and 27' do not change to the state with closed contacts until the protective door that is being monitored has been operated at least once after the mains power supply has been switched on. In order to achieve this, the break contact switches 35 and the make contact switch 36 are connected by their joint connection to the output 22, and are thus connected to the inputs 16 and 17.

Figure 7:
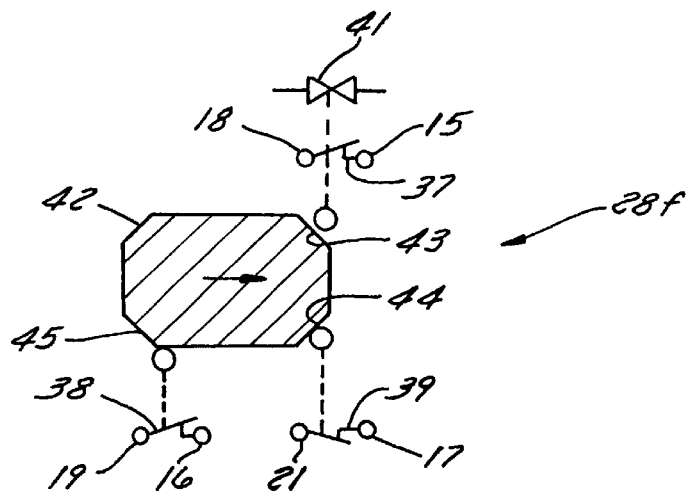

FIG. 7 shows a signaling device 28f as a protective door safety switch having three position switches for covers and protective devices with two separate interlock systems. The signaling device 28f has a break contact switch 37, a make contact switch 38 which is operated when the door is closed, and a break contact switch 39. The break contact switch 37 is mechanically connected to a fluid shut-off valve 41, so that operation of the break contact switch 37 is equivalent to operating the shut-off valve 41. Such signaling devices are used, for example, for protective doors for injection molding or die casting machines, or blow molding machines.

All the switches 37, 38 and 39 are moved via a common cam 42, and, to be precise, the break contact switches 37 and 39 are operated by rising flanks 43 and 44, and the make contact switch 38 is operated by a falling cam flank 45.

In order that the safety switching device 1 can clearly identify that a signaling device 28f is connected, the break contact switch 37 is connected between the output 18 and the input 15, the make contact switch 38 is connected between the output 19 and the input 16, and the break contact switch 39 is connected between the output 21 and the input 17.

Figure 8:
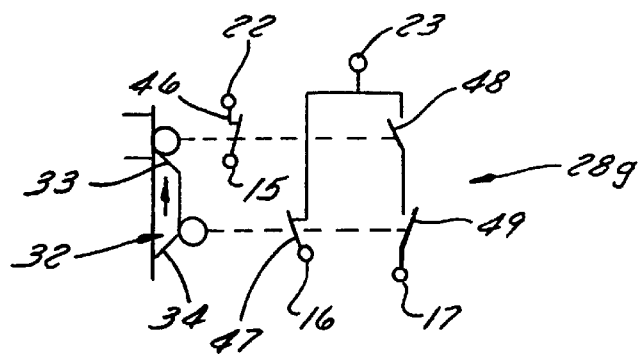
Figure 9:
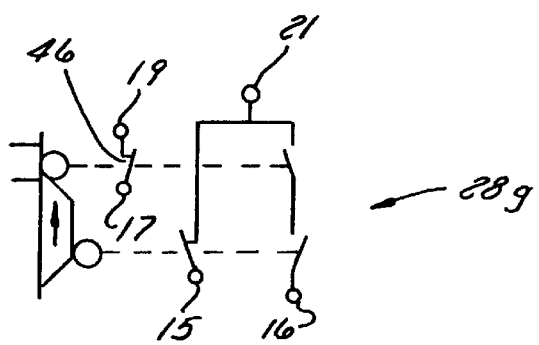
Figure 11:
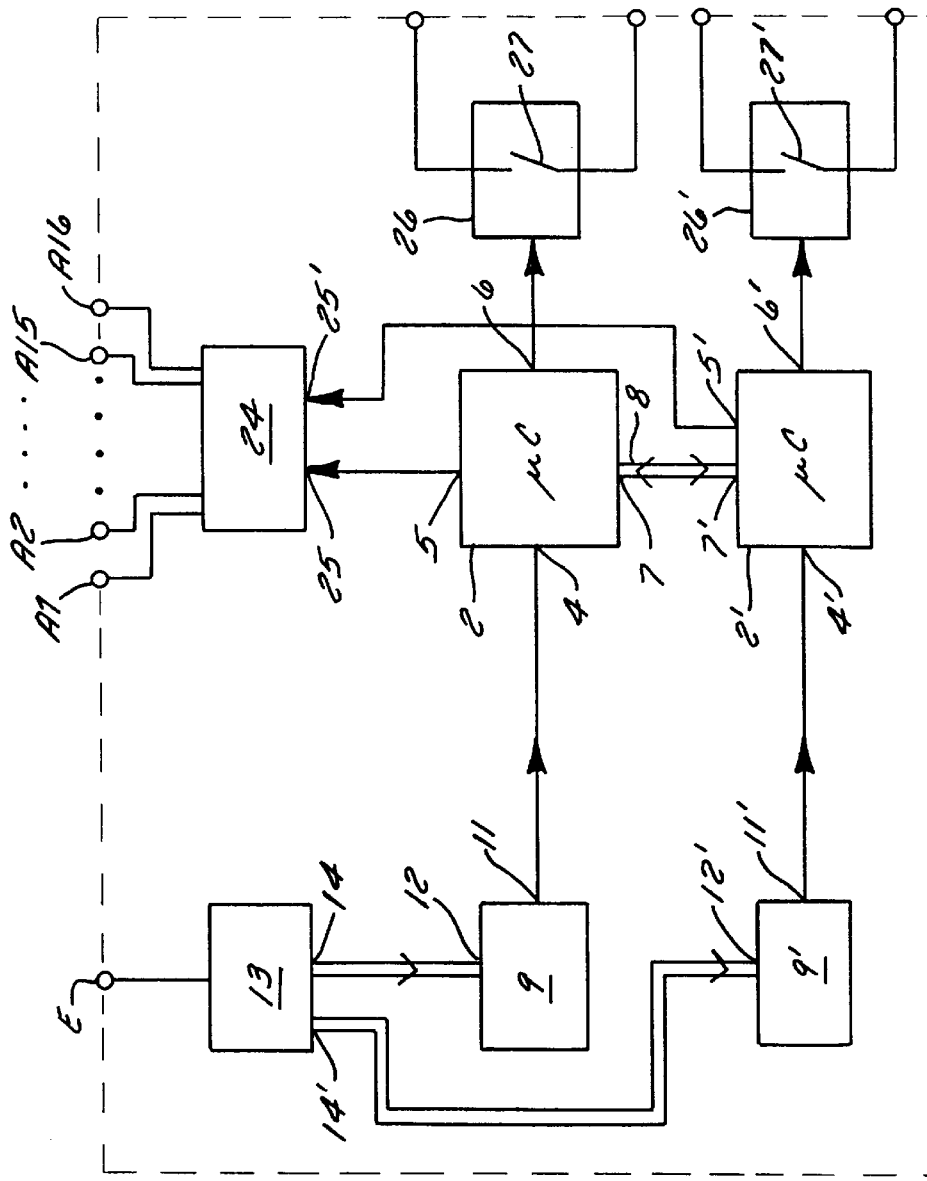
FIG. 11 shows the outline circuit diagram of an exemplary embodiment of a safety switching device having only different outputs for the individual signaling devices.

FIGS. 8 and 9 show a signaling device 28g which contains a break contact switch 46, a make contact switch 47 which is operated when the door is closed, and two make contact switches 48 and 49, which are opened when the door is closed. The two make contact switches 48 and 49 are connected in series. In the opposite mechanical sense, there is a connection between the make contact switch 48 and the break contact switch 46, in the sense that these two switches are operated jointly in a positively interlocked manner, while the make contact switch 49 and the make contact switch 47 have their own mechanical actuation, and these two switches are also positively coupled to one another. Operation is by means of a cam 32, as has already been illustrated in conjunction with FIG. 4, with the rising cam flank 33 operating the break contact switch 46 and the make contact switch 48, while the falling cam flank 34 ensures that the make contact switch 47 and the make contact switch 49 switch over.

Since the arrangement shown in FIG. 8 is intended to ensure automatic starting after the mains power supply is switched on, the safety switching device 1 must be able to distinguish between the arrangement shown in FIG. 8 and the arrangement shown in FIG. 9, which is intended to ensure that a start-up test is carried out, that is to say the protective door must be operated once after the operating voltage is switched on, in order to ensure that the signaling device 28g is also operating correctly. In consequence, the safety device 1 has to behave differently, for which reason the connection between the inputs and outputs is made as illustrated. Without a start-up test, the signaling device 28g is connected on the one hand to the outputs 22 and 23 and on the other hand to the inputs 15, 16 and 17, while, where a start-up test is desired, the same signaling device 28g must be connected to the outputs 19 and 21 as well as to the inputs 15, 16 and 17.

FIG. 10 shows a table which indicates how the various signaling devices 28a to 28g must be connected to the various inputs 15,16 and 17 as well as to the outputs 18 . . . 23. As can be seen, there is a unique relationship, in the sense that the safety switching device 1 can clearly identify which signaling device 28 is connected, and how it is intended to react if necessary.

In the table, the columns have the reference symbols of the relevant output, and the rows have the reference symbols of the corresponding input. The individual table boxes indicate the corresponding figures in which the respective signaling devices are illustrated.

If, for example, the safety switching device 1 finds during the identification routine explained above that the output 18 is connected to the input 15, the output 19 is connected to the input 16 and the output 21 is connected to the input 17, but that otherwise no connections exist, this clearly indicates to the safety switching device 1 that the signaling device 28f is connected in the manner shown in FIG. 7. The switching function required in this case must therefore be carried out.

If, in contrast, only a connection between the output 18 and the input 15 as well as the output 19 and the input 16 were identified, a faulty connection would be present since there would be no permissible complete association of the inputs and outputs. The safety switching device 1 would remain in the switched-off state.

As a further example, let us assume that the safety switching device identifies a connection between the output 18 and the input 16, and between the output 19 and the input 15, which would correspond per se to the connection shown in FIG. 4 and FIG. 3, and in addition, owing to a cross-connection in the connecting cable 33, that there is a connection between the output 18 and the input 15, as well as between the output 19 and the input 16. There would thus be more connections than those permissible according to FIG. 3 for which reason, in this case as well, the safety switching device 1 would change to a fault state since not only the permissible table boxes are filled but, furthermore, other table boxes as well, which are mutually exclusive.

As is evident from the explanation, just five outputs and three inputs can be used to provide a safety switching device 1 which, overall, can process eight different connections by means of signaling devices without any reprogramming or the use of links or jumpers being required, and which is intended to behave differently. The safety switching device 1 selects the correct function just by connection to the corresponding inputs and outputs. Enhanced safety is thus provided both against faulty connection and during subsequent operation. The connecting links are normally screw connections and, after they have been switched once, are no longer opened.

Figure 12:
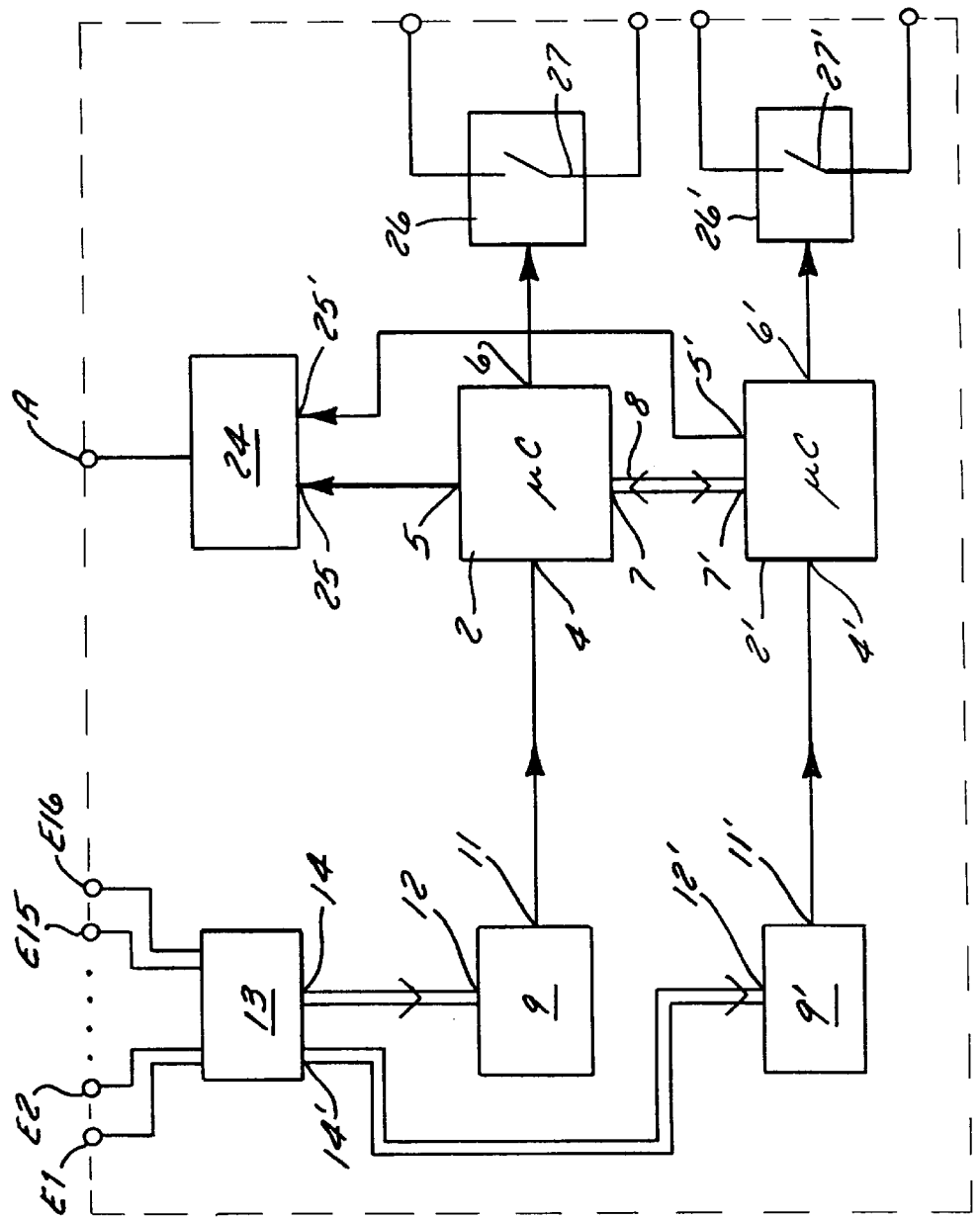
FIG. 12 shows the outline circuit diagram of an exemplary embodiment of a safety switching device having only different inputs for the individual signaling devices.

Instead of having to use a combination of a plurality of outputs and a plurality of inputs as shown in FIG. 1, the safety switching device 1 can also be programmed by using just one output and a plurality of inputs, or by using one input and a plurality of outputs. In order to make it possible to distinguish between the various cases shown in FIG. 2 to FIG. 9, it is possible to use, for example, a safety switching device having sixteen outputs A1 . . . A16 and one input E, or sixteen inputs E1 . . . E16 and one output A. Such safety switching devices are shown in FIG. 12; otherwise, they operate essentially as explained above.

A modular safety switching device is set up in order to allow connection of various signaling devices in a set of possible signaling devices which can be connected. In this case, a typical combination of inputs and outputs that are used is provided for each signaling device in the set. The nature of the connection of the signaling device is unique for each signaling device within the set, as a result of which the safety switching device can use the closed electrical connections during start-up to identify what type of signaling device is connected and what function is required if the signaling devices are the same. The safety switching device automatically changes to the required operating mode on the basis of this association.

What is claimed is:

1. A safety switching device (1) for monitoring system operating states, which is set up for the connection of at least one signaling device (28) which has at least two switching states, in which case the signaling device (28) is selected from a set of signaling devices (28a . . . 28g) which are intended for connection to the safety switching device (1) and which have different numbers of break and/or make contacts (29,31,35,36,37,38,39,46,47,48), having a set of inputs (E1 . . . E16) to which the signaling devices (28) can be connected, in which case defined inputs (E1 . . . E16) are assigned to specific signaling devices (28), having at least one output (A) which is provided jointly for a plurality of the signaling devices (28), and having an identification device (2) for identifying the respective signaling device (28) from the set of possible signaling devices (28a . . . 28g).

2. A safety switching device (1) for monitoring system operating states, which is set up for the connection of at least one signaling device (28) which has at least two switching states, in which case the signaling device (28) is selected from a set of signaling devices (28a . . . 28g) which are intended for connection to the safety switching device (1) and which have different numbers of break and/or make contacts (29,31,35,36,37,38,39,46,47,48), having at least one input (E) which is provided jointly for a plurality of signaling devices (28), and having a set of outputs (A1 . . . A16) which the signaling devices (28) can be connected, in which case defined outputs (18 . . . 23) are assigned to specific signaling devices (28), having an identification device (2) for identifying the respective signaling device (28) from the set of possible signaling devices (28a . . . 28g).

3. A safety switching device (1) for monitoring system operating states, which is set up for the connection of at least one signaling device (28) which has at least two switching states, in which case the signaling device (28) is selected from a set of signaling devices (28a . . . 28g) which are intended for connection to the safety switching device (1) and which have different numbers of break and/or make contacts (29, 31, 35, 36, 37, 38, 39, 46, 47, 48), having a set of inputs (15 . . . 17) to which the signaling devices (28) can be connected, in which case defined inputs (15 . . . 17) are assigned to specific signaling devices (28), having a set of outputs (18 . . . 23) to which the signaling devices (28) can be connected, in which case defined outputs (18 . . . 23) are assigned to specific signaling devices (28), and having an identification device (2) for identifying the respective signaling device (28) from the set of possible signaling devices (28a . . . 28g).

4. The safety switching device as claimed claim 1, wherein the identification device (2) identifies a signaling device (28) by checking all the inputs (15 . . . 17) of the set of inputs (15 . . . 17) and/or all the outputs (18 . . . 23) of the set of outputs (18 . . . 23), and by comparing with a table (FIG. 10) those inputs (15 . . . 17) and/or outputs (18 . . . 23) which have been identified as being connected, which table contains the association between the respective inputs (15 . . . 17) and/or outputs (18 . . . 23) of the set and those signaling devices (28*a* . . . 28*g*) in the set which are associated with the relevant inputs (15 . . . 17) and/or outputs (18 . . . 23).

5. The safety switching device as claimed claim 1, wherein the identification device (2) is set up in order to test whether the signaling device (28) is connected to that or those inputs (15 . . . 17) and/or outputs (18 . . . 23) of the set of inputs (15 . . . 17) and/or outputs (18 . . . 23) which are intended for the relevant signaling device (28).

6. The safety switching device as claimed claim 1, wherein the set of signaling devices (28*a* . . . 28*g*) includes a signaling device (28*a*) in the form of a simple break contact switch (29).

7. The safety switching device as claimed claim 1, wherein the set of signaling devices (28*a* . . . 28*g*) includes a signaling device (28*b*) having at least two break contact switches (29,31).

8. The safety switching device as claimed in claim 7, wherein the at least two break contact switches (29,31) are positively coupled to one another.

9. The safety switching device as claimed claim 1, wherein the set of signaling devices(28*a* . . . 28*g*) includes a signaling device (28*c*,28*d*) having at least one break contact switch (35) and having at least one make contact switch (36).

10. The safety switching device as claimed in claim 9, wherein the at least one break contact switch (35) and the at least one make contact switch (36) are mechanically positively coupled to one another.

11. The safety switching device as claimed claim 1, wherein the set of signaling devices (28*a* . . . 28*g*) includes a signaling device (28*f*) having three break contact switches (37,38,39) which may be controlled via a cam (42).

12. The safety switching device as claimed in claim 11, wherein one of the three break contact switches (37) is mechanically coupled to a fluid valve (41).

13. The safety switching device as claimed claim 1, wherein the set of signaling devices (28*a* . . . 28*g*) includes a signaling device (28*g*) having at least two sets of switches (46,47;48,49) one of which is a break contact switch (46,49) and the other of which is a make contact switch (47,48) and wherein the switches (46,47;48,49) in a set are mechanically positively coupled to one another.

14. The safety switching device as claimed claim 1, wherein the switching device is designed with a plurality of channels, and wherein the switching device has an associated identification device (2,2') in each channel.

15. The safety switching device as claimed claim 1, wherein this switching device includes an initialization device (2) which is activated by the return of the supply voltage and is connected to the identification device (2) in order to cause the connection of the inputs (15 . . . 17) and/or outputs (18 . . . 23) to the signaling devices (28) to be checked.

16. The safety switching device as claimed claim 1, wherein this switching device includes at least one microprocessor (2,2') in which the identification device and/or the initialization device are/is implemented as a program.

* * * * *